United States Patent
Porikli

(10) Patent No.: US 7,426,301 B2
(45) Date of Patent: Sep. 16, 2008

(54) USUAL EVENT DETECTION IN A VIDEO USING OBJECT AND FRAME FEATURES

(75) Inventor: Fatih M. Porikli, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 834 days.

(21) Appl. No.: 10/878,958

(22) Filed: Jun. 28, 2004

(65) Prior Publication Data

US 2005/0286774 A1 Dec. 29, 2005

(51) Int. Cl.
 G06K 9/00 (2006.01)
 G06K 9/46 (2006.01)
 G06K 9/66 (2006.01)
 G06K 9/62 (2006.01)

(52) U.S. Cl. ............... 382/181; 382/190; 382/224; 382/225

(58) Field of Classification Search ............... 382/181, 382/190, 224, 225; 348/143
See application file for complete search history.

(56) References Cited

U.S. PATENT DOCUMENTS

| | | | | |
|---|---|---|---|---|
| 6,774,917 | B1 * | 8/2004 | Foote et al. | 715/700 |
| 7,103,225 | B2 * | 9/2006 | Yang et al. | 382/225 |
| 7,158,680 | B2 * | 1/2007 | Pace | 382/232 |

OTHER PUBLICATIONS

G.L. Scott and H. C. Longuet-Higgins, "Feature grouping by relocalisation of eigenvectors of the proximity matrix" *Proc. British Machine Vision Conference*, 103-108, 1990.
N. Johnson and D. Hogg, "Learning the distribution of object trajectories for event recognition," *Proc. British Machine Vision Conference*, 583592, 1995.
S. Kamvar, D. Klein, and C. Manning, "Interpreting and Extending Classical Agglomerative Clustering Algorithms using a Model-Based Approach," *Proc. ICML*, 2002.
V. Kettnaker, "Time-dependent HMMs for visual intrusion detection," *Proc. IEEE Workshop on Detection and Recognizing Events in Video*, 2003.
Z. Marx, I. Dagan, and J. Buhmann, "Coupled Clustering: a Method for Detecting Structural Correspondence," *Proc. International Conference on Machine Learning*, 353-360, 2001.
G. Medioni, I. Cohen, F. Bremond, S. Hongeng, and R. Nevatia, "Event detection and analysis from video streams," *IEEE Trans. on PAMI*, 23 (8), 873-889, 2001.
M. Meila and J. Shi, "Learning Segmentation by Random Walks," *Proc. Advances in Neural Information Processing Systems*, 2000.

(Continued)

*Primary Examiner*—Matthew C. Bella
*Assistant Examiner*—John B Strege
(74) *Attorney, Agent, or Firm*—Dirk Brinkman; Clifton D. Mueller; Gene V. Vinokur

(57) ABSTRACT

The invention provides a method for detecting usual events in a video. The events are detected by first constructing an aggregate affinity matrix from features of associated items extracted from the video. The affinity matrix is decomposed into eigenvectors, and the eigenvectors are used to reconstruct approximate estimates of the aggregate affinity matrix. Each matrix is clustered and scored, and the clustering that yields the highest scores is used to detect usual events.

8 Claims, 5 Drawing Sheets

OTHER PUBLICATIONS

A. Ng, M. Jordan, and Y. Weiss, "On spectral clustering: Analysis and an algorithm," *Proc. of Neural Information Processing Systems*, 2001.

T. Starner and A. Pentland, "Visual recognition of american sign language using hidden Markov models," *Proc. Int'l Workshop Automatic Face- and Gesture-Recognition*, 1995.

C. Stauffer and W.E. Grimson, "Learning patterns of activity using real-time tracking," *IEEE Trans. on Pattern Analysis and Machine Intelligence*, 22 (8), 747-757, 2000.

Y. Weiss, "Segmentation using eigenvectors: a unifying view," *Proc. IEEE International Conference on Computer Vision*, 975-982, 1999.

C. C. Paige, B. N. Parlett, and H. A. van der Vorst. Approximate solutions and eigenvalue bounds from Krylov subspaces. Numer. Linear Algebra Appl., 2, pp. 115-133, 1995.

L. Zelnik-Manor and M. Irani, "Event-Based Video Analysis," *IEEE Conf. Computer Vision and Pattern Recognition*, Dec. 2001.

J. Davis and A. Bobick, "Representation and recognition of human movement using temporal templates," *Proc. IEEE Conf. Computer Vision and Pattern Recognition*, 1997.

A. Bobick and J. Davis, "The Recognition of Human Movement Using Temporal Templates," IEEE Transactions on Pattern Analysis and Machine Intelligence, vol. 23, No. 3, pp. 257-267, 2001.

S. Kamvar, D. Klein and C. Manning, "Spectral Learning," International Joint Conference on Artificial Intelligence, Apr. 2003.

* cited by examiner

500

|          | Object 1 | Object 2 | Object 3 |       |
|----------|----------|----------|----------|-------|
| Object 1 | 1        | 0.2      | 0.9      | = 2.1 |
| Object 2 | 0.2      | 1        | 0.5      | = 1.7 |
| Object 3 | 0.9      | 0.5      | 1        | = 2.4 |
|          | = 2.1    | = 1.7    | = 2.4    |       |

*Fig. 6*

USUAL EVENT DETECTION IN A VIDEO USING OBJECT AND FRAME FEATURES

RELATED APPLICATIONS

This patent application is related to U.S. patent application Ser. No. 10/878,943, "Unusual Event Detection in a Video Using Object and Frame Features," filed by Porikli herewith and incorporated herein by reference, and U.S. patent application Ser. No. 10/878,941, "Hidden Markov Model Based Object Tracking and Similarity Metrics," filed by Porikli herewith and incorporated herein by reference.

FIELD OF THE INVENTION

This patent relates generally to detecting events in a video, and more particularly to detecting usual events.

BACKGROUND OF THE INVENTION

To detect events in videos is necessary to interpret "semantically meaningful object actions," A. Ekinci, A. M. Tekalp, "Generic event detection in sports video using cinematic features," *Proc. IEEE Workshop on Detection and Recognizing Events in Video,* 2003. To perform 'action' or event detection, a gap between numerical features of objects and symbolic description of meaningful activities needs to be bridged. Prior art event detection methods generally extract trajectories of features from a video, followed by supervised learning.

For example, one method is based on view-dependent template matching, J. Davis and A. Bobick, "Representation and recognition of human movement using temporal templates," *Proc. IEEE Conf. Computer Vision and Pattern Recognition,* 1997. There, action is represented by a temporal template, which is determined from accumulative motion properties at each pixel in a video.

Another method detects simple periodic events, e.g., walking, by constructing dynamic models of periodic patterns of human movements. L. Davis, R. Chelappa, A. Rosenfeld, D. Harwood, I. Haritaoglu, and R. Cutler, "Visual Surveillance and Monitoring," *Proc. DARPA Image Understanding Workshop,* pp. 73-76, 1998.

Distributions of object trajectories can also be clustered, N. Johnson and D. Hogg, "Learning the distribution of object trajectories for event recognition," *Proc. British Machine Vision Conference,* pp. 583-592, 1995. A hierarchy of similar distributions of activity can also be estimated using co-occurrence feature clustering, C. Stauffer and W. E. Grimson, "Learning patterns of activity using real-time tracking," *IEEE Trans. on Pattern Analysis and Machine Intelligence,* 22(8), pp. 747-757, 2000.

Events can be defined as temporal stochastic processes to provide a segmentation of a video, L. Zelnik-Manor and M. Irani, "Event-Based Video Analysis," *IEEE Conf. Computer Vision and Pattern Recognition,* December 2001. Their dissimilarity measure is based on a sum of $\chi^2$ divergences of empirical distributions, which requires off-line training, and the number of clusters is preset.

A hidden Markov model (HMM) can represent a simple event and recognize the event by determining the probability that the model produces a visual observation sequence, T. Starner and A. Pentland, "Visual recognition of American sign language using hidden Markov models," *Proc. Int'l Workshop Automatic Face—and Gesture-Recognition,* 1995.

A HMM can also be used for detecting intruders, V. Kettnaker, "Time-dependent HMMs for visual intrusion detection," *Proc. IEEE Workshop on Detection and Recognizing Events in Video,* 2003.

Prior art HMM-based methods generally require off-line training with known events before the events themselves can be detected. However, it is not foreseeable that every possible event can be known beforehand. Furthermore, the same events can vary among different applications. Thus, modeling and detecting events is a difficult problem.

A number of other event detection methods are known, A. Ng, M. Jordan, and Y. Weiss, "On spectral clustering: Analysis and an algorithm," *Proc. of Neural Information Processing Systems,* 2001, M. Meila and J. Shi, "Learning Segmentation by Random Walks," *Proc. Advances in Neural Information Processing Systems,* 2000, Z. Marx, I. Dagan, and J. Buhmann, "Coupled Clustering: a Method for Detecting Structural Correspondence," *Proc. International Conference on Machine Learning,* pp. 353-360, 2001, S. Kamvar, D. Klein, and C. Manning, "Interpreting and Extending Classical Agglomerative Clustering Algorithms using a Model-Based Approach," *Proc. ICML,* 2002, and M. Fiedler, "A property of eigenvectors of non-negative symmetric matrices and its application to graph theory," *Czeckoslovak Mathematical Journal,* 25: pp. 619-672, 1975.

However, those methods address different issues. For instance, Ng et al., use K-means clustering. They do not consider a relation between an optimal number of clusters and a number of largest eigenvectors. Meila et al. extend the method of Ng et al. to generalized eigenvalue representation. Although they use multiple eigenvectors, the number of eigenvectors is fixed. Kamvar requires supervisory information, which is not always available. Marx et al. use coupled-clustering with a fixed number of clusters. A big disadvantage of these methods is that they are all limited to trajectories duration of equal lengths because they depend on correspondences between coordinates.

The extraction of trajectories of objects from videos is well known. However, very little work has been done on investigating secondary outputs of a tracker. One method uses eight constant features, which include height, width, speed, motion direction, and the distance to a reference object, G. Medioni, I. Cohen, F. Bremond, S. Hongeng, and R. Nevatia, "Event detection and analysis from video streams," *IEEE Trans. on PAMI,* 23(8), 873-889, 2001. Visual features can also be considered, see Zelnik et al., and Stauffer et al. Zelnik et al. use spatiotemporal intensity gradients at different temporal scales. Stauffer et al. use co-occurrence statistics of coordinate, speed and size. However, prior art trajectory-based features are insufficiently expressive to detect many events.

Therefore, it is desired to provide more expressive features, which can be used to detect events that normally cannot be detected using conventional features. Furthermore, it is desired to provide a method that uses an unsupervised learning method.

SUMMARY OF THE INVENTION

The invention provides a method for detecting events in a video. The method uses a set of frame-based and object-based statistical features extracted from the video. The statistical features include trajectories, histograms, and hidden Markov models of feature speed, orientation, location, size, and aspect ratio. The low-level features that are used to construct the statistical features can be colors and motion in the video.

The invention also uses a spectral clustering process that estimates automatically an optimal number of clusters. The clustering process uses high dimensional data without affecting performance.

Unlike prior art methods, which fit predefined models to events, the invention determines events by analyzing validity and conformity scores. The invention uses affinity matrices and applies an eigenvalue decomposition to determine an optimum number of clusters that are used to detect events.

BRIEF DESCRIPTION OF THE DRAWINGS

FIG. 6 is a block diagram of a scored affinity matrix.

DETAILED DESCRIPTION OF THE PREFERRED EMBODIMENT

Our invention provides a method for detecting events in a video based on features extracted from the video. The features are associated with items. An item can be an object in the video, or a frame of the video.

Object Trajectories and Features

In a first embodiment, the items considered are objects. The objects can be segmented from the video in any know manner. Object segmentation is well known, and numerous techniques are available. A spatial-temporal trajectory is a time-sequence of coordinates representing a continuous path of a moving object in the video. The coordinates correspond to positions of the object in the consecutive frames. Typically, the position of "an object region" indicates a center-of-mass for a pixel-based model, an intersection of main diagonals for an ellipsoid model, and an average of minimum and maximum on perpendicular axes for a bounding box model.

We use the following notation for defining an object trajectory $$T:\{p_n\}:\{(x_1, y_1, t_1), (x_2, y_2, t_2), \ldots, (x_N, y_N, t_N)\},$$

where (x, y) indicates the coordinates, and N is the duration of the trajectory, measured in terms of frames, for example.

Figure 1:
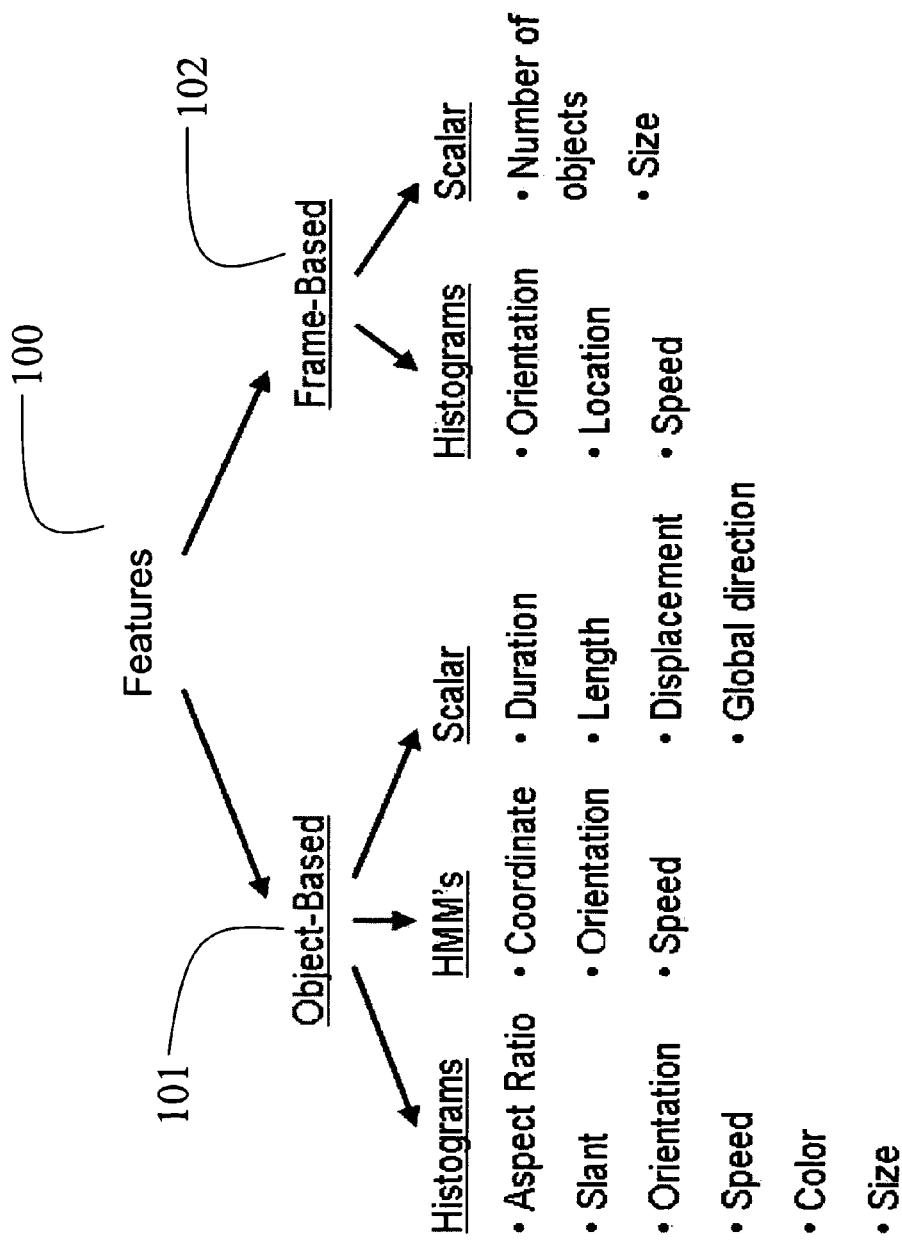
FIG. 1 is a classification of features according to the invention.

As shown in FIG. 1, we use item features 100 that can be broadly classified into two groups 101 and 102. Object-based features 101 describe properties of individual objects in the video. Frame-based features 102 represent properties of each video frame. Furthermore, the features can be further classified as statistical features, e.g., histograms, HMMs, and scalars derived from low-level features. The features can be visual, e.g., color and motion, or audio, e.g., volume and pitch, or sound classifications, e.g., male, female, music, and cheering.

Some features change their values from frame to frame during the tracking process, e.g., the speed of an object. Such dynamic features can be represented statistically in terms of a normalized histogram. A histogram corresponds to a density distribution of the feature. Thus, the feature includes a mean, a variance and higher order moments. However, because histograms discard a temporal ordering, the histograms are more useful for evaluating statistical attributes.

We also use HMM-based representations that capture dynamic properties of features. The HMM representation are more expressive than the histograms. Because feature comparison requires vectors to have equal dimensions, dynamic features that have varying dimensions are transferred into a common parameter space using the HMMs. We also represent some features as scalar values.

Object-Based Features

If the item is an object, then the duration of an object in a sequence of frames is a distinctive feature. For example, with a surveillance camera, a suspicious event may be an unattended bag, which can be detected easily because humans do not tend to stay still for extended periods of time. In this example, a moving object instantly becomes a perfectly stationary object.

The total length of the trajectory is defined as $\Sigma_{n=2}^{N}|T(n)-T(n-1)|$. This is different from the total displacement of the object, which is equal to $|T(1)-T(N)|$.

A total orientation descriptor represents a global direction of the object. Depending on the camera arrangement, the length related descriptors can be used to differentiate unusual paths. A length/duration ratio expresses an average speed of the object.

Dynamic properties of the object, such as orientation $\phi(t)$, aspect ratio $\delta y = \delta x$, slant, i.e., an angle between a vertical axis and a main diagonal of object, size, instantaneous speed $|T(n)-T(n-k)|=k$, location, and color are represented by histograms. A location histogram keeps track of coordinates, where the object appears in the frames.

Color can be represented using a histogram of a small number of dominant colors. Using color histogram, it is possible to identify objects, e.g., opposing players in a sports video.

Using the size histogram, dynamic properties of the object can be determined, e.g., it is possible to distinguish an object moving towards the camera, assuming the size of the object increases, from another object moving away or parallel to the camera.

Because an object can move at different speeds during the tracking, an instantaneous speed of the object is accumulated in a histogram. For some events, speed is a key aspect, e.g., a running person among a crowd of pedestrians. The speed histogram can be used to interpret an irregularity of movement, such as erratically moving objects. For example, a traffic accident can be detected using the speed histogram because the accumulated speeds vary greatly, instead of being distributed evenly for normal traffic flow.

The orientation histogram is a good descriptor. For instance, it becomes possible to distinguish objects moving on a certain path, e.g., objects making circular, or oscillating movements. For example, it is possible to detect a vehicle backing up on a wrong lane and then driving correctly again, which may not be detected using a global orientation.

The aspect ratio is a good descriptor to distinguish between humans and vehicles. The aspect ratio histogram can detect whether a person is lying, crouching, or standing up during the trajectory.

Object coordinates reveal spatial correlation between trajectories. However in some applications, it is more important to distinguish similarities of shapes of trajectories, independent of the object coordinates.

Figure 2:
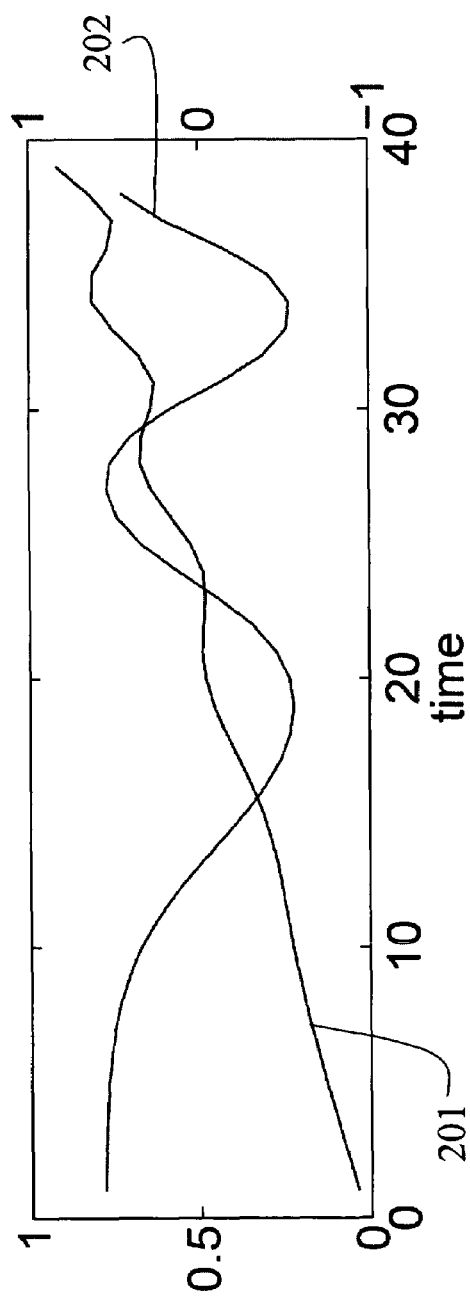
FIG. 2 is a time-sequence of feature speed and orientation.
Figure 3:
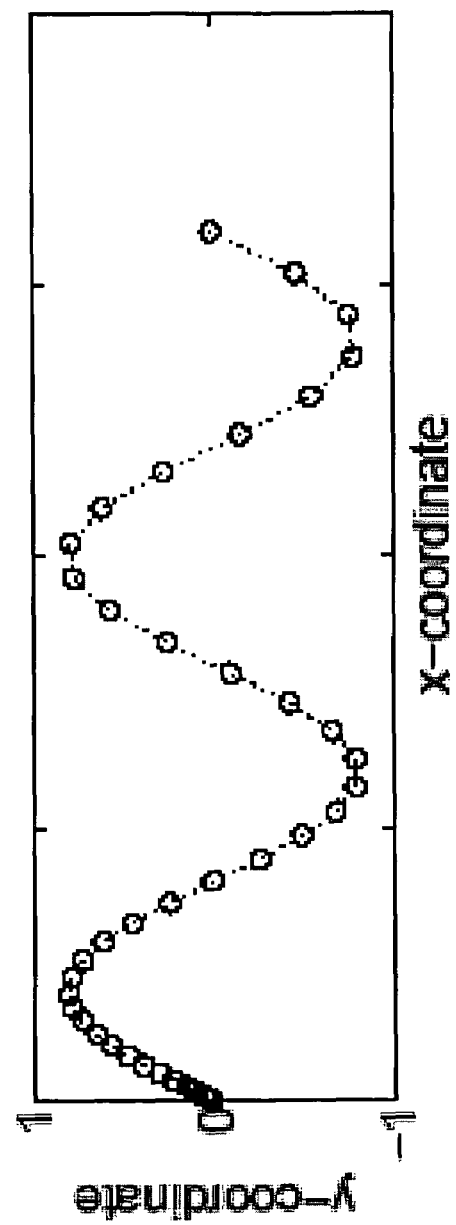
FIG. 3 is a sequence of sample coordinates.

As shown in FIG. 2, the instantaneous speed 201 and orientation 202 of an object can establish a shape similarity even when there is a spatial translation. These two sequences 201-202 are a mapping from trajectory coordinates, as shown in FIG. 3, to time functions $\mathfrak{R}^2 \rightarrow R$.

Frame-Based Features

If the item is in a frame, then the frame-based features specify the characteristics of each frame. Frame-based features become more distinctive as the number of the visible objects in the frame increases.

The number of objects detected in the frame is one frame-based feature. This feature can provide an indication of unusual events, such as one or more persons in a room that should otherwise be empty. A total size of the objects can also indicate a level of occupancy in a room. An aggregated location histogram indicates where objects are located. A histogram of instantaneous orientations of objects indicates directions of objects, which can be used to detect changes of traffic flow, e.g., wrong lane entries. In a sports video, orientation can indicate the attacking team. Speed defines the motion of objects in the frame. This feature can identify frames where an object has a different speed than other frames. The frame-based histogram of the aspect ratios and histogram of the size is defined similarly.

HMM Representations

We transfer the coordinate, orientation, and speed features of items to a parameter space λ that is characterized by a set of HMM parameters. An HMM is a probabilistic model including a number of inter-connected states in a directed graph, each state emitting an observable output. Each state is characterized by two probability distributions: a transition distribution over states, and an emission distribution over the output symbols.

A random system described by such a model generates a sequence of output symbols. Because the activity of the system is observed indirectly, through the sequence of output symbols, and the sequence of states is not directly observable, the states are said to be hidden.

We replace the trajectory information as the emitted observable output of the directed graph. Then, the hidden states represent transitive properties of the consecutive coordinates of the spatio-temporal trajectory. The state sequence that maximizes the probability becomes the corresponding model for the trajectory.

A simple specification of an K-state $\{S_1, S_2, \ldots, S_K\}$ continuous HMM with Gaussian observations is given by:

1. A set of prior probabilities $\pi=\{\pi_i\}$, where $\pi_i=P(q_1=S_i)$ and $1 \leq i \leq K$.
2. A set of state transition probabilities $B=\{b_{ij}\}$, where $b_{ij}=P(q_{t+1}=S_j|q_t=S_i)$ and $1 \leq i,j \leq K$.
3. Mean, variance and weights of mixture models $N(O_t, \mu_j, \sigma_j)$, where $\mu_j$ and $\sigma_j$ are the mean and covariance of the state j.

Above, $q_t$ and $O_t$ are the state and observation at time t. For each trajectory T, we fit an M-mixture HMM $\lambda=(\pi, B, \mu, \sigma)$ that has a left-to-right topology using the well known Baum-Welch process. We select the left-to-right topology because it can efficiently describe continuous processes. We train the HMM model using the trajectory itself as the training data. In other words, our training is unsupervised.

As a result, each trajectory is assigned to a separate model. An optimum number of states and mixtures depends on a complexity and duration of the trajectory. To provide sufficient evidence for every Gaussian distribution of every state while training, the duration of the trajectory should be much larger than the number of mixtures times the number of states, $N >> M \times K$. On the other hand, a state can be viewed as a basic pattern of the trajectory. Thus, depending on the trajectory, the number of states is sufficiently large to conveniently characterize distinct patterns, yet small enough to prevent over-fitting.

Features to Events

As described above, an event can be defined as "an action at given place and time." We detect two types of events using our extracted features: object-base events, and frame-based events. An object-based event is detected by clustering objects. Similarly, a frame-based event is detected from a clustering of frames, and corresponds to a particular time instance or duration of an event.

In addition, we detect usual and unusual events. A usual event indicates a commonality of activities, e.g., a path that most people walks, etc. An unusual event is associated with a distinctness of an activity. For instance, a running person among a crowd of pedestrians is interpreted as unusual, as well as a walking person among a crowd of runners.

Usual Event Detection

Figure 4:
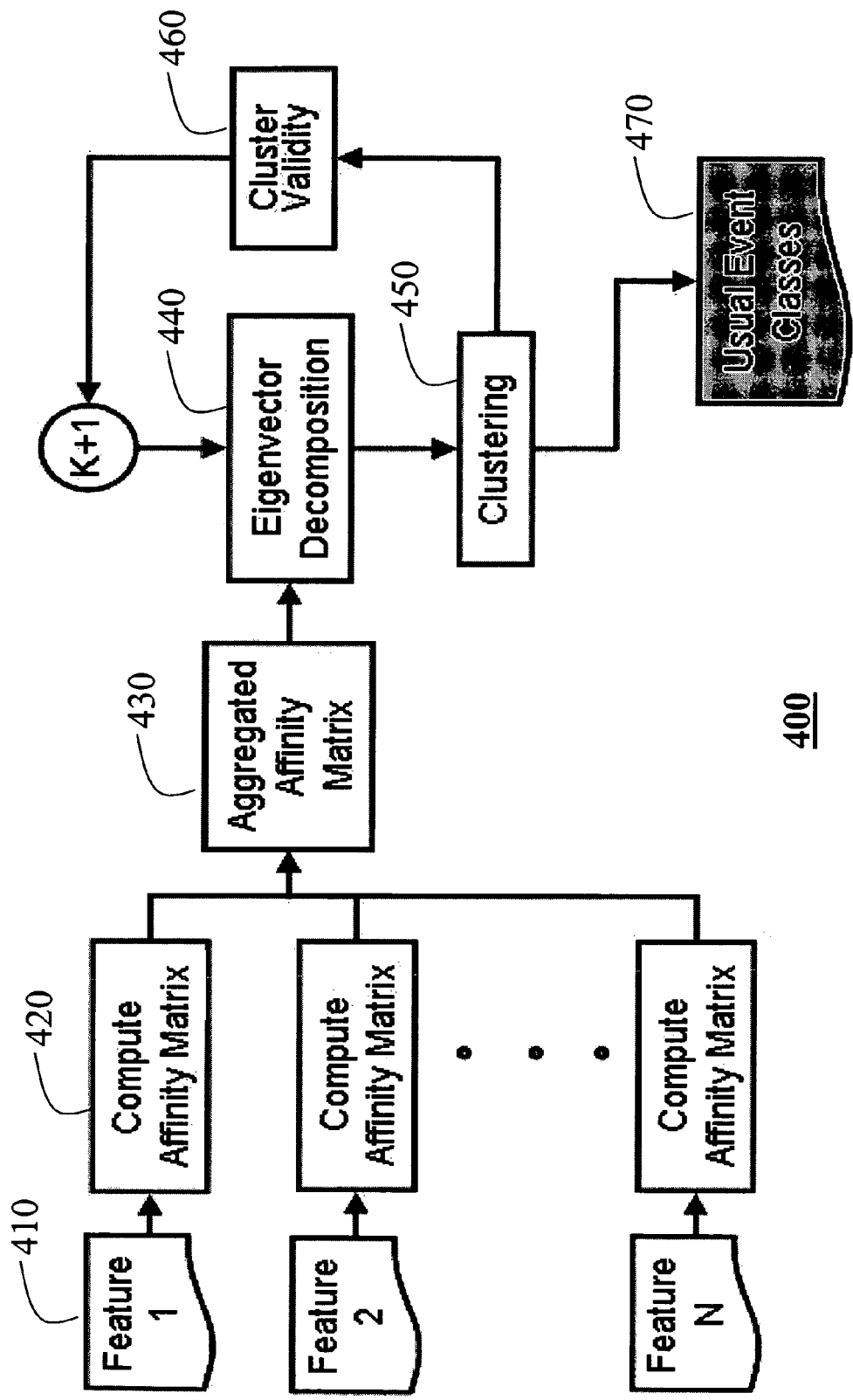
FIG. 4 is a flow diagram of a method for detecting usual events.

FIG. 4 shows a method 400 for detecting usual events according to the invention. Features 410 are extracted from a video for items (objects or frames) as described above. The features can be low-level visual or audio features present in the video, such as color and motion, or volume and pitch. The features can be object-based or frame-based as described above. Furthermore, higher order statistical moments of the features can be determined, or the features can be represented by models.

For each item feature, an affinity matrix 420 is constructed using pair-wise object or frame similarities, based on the extracted features. The similarities can be in terms of a distance function. For example, if there are three objects, then an affinity matrix A is 3×3, see FIG. 6, if there are 1000 frames, then the affinity matrix A is 1000×1000. Affinity matrices are described in detail in the related applications.

Then, the affinity matrices for all of the features are aggregated 430, by a weighted addition and a normalization to [0:1], to obtain an aggregated matrix. The weighting can favor some features over others, depending on a priori information and the application.

We apply an eigenvector decomposition 440 to the aggregate affinity matrix using Ritz values, see C. C. Paige, B. N. Parlett, and H. A. van der Vorst. Approximate solutions and eigenvalue bounds from Krylov subspaces. *Numer. Linear Algebra Appl.*, 2, pp. 115-133, 1995. The decomposition includes the following steps: A predetermined number of eigenvalues are produced. The eigenvalues are rank ordered first-to-last. The eigenvalues are used to determine eigenvectors. The eigenvectors are multiplied times themselves, as a cross-product, to reconstruct an approximation of the aggregate affinity matrix. In our method, we produce a reconstructed approximate affinity matrix for the first eigenvector, for the first and second eigenvector, for the first three eigenvectors, and so forth, each reconstruction including one additional eigenvector, up to the predetermined number of eigenvalues.

Clustering 450 is applied to each approximate aggregate affinity matrix. The clustering 450 identifies groups of like items (objects or frames), depending on the underlying features. Each clustering is evaluated to determine a cluster validity score 460.

When all of the approximate aggregate affinity matrices have been evaluated, the one that yields a highest cluster validity score is selected as the one that best detects the usual events 470.

Note that it is possible to determine pair-wise distances for unequal duration trajectories, which are very common for object tracking applications, but it is not possible to map all the trajectories into a uniform data space where the vector dimension is constant. Prior art clustering methods that require uniform feature size are of no use to the invention. Therefore, we provide a spectral clustering.

We now describe further details of our method.

Affinity Matrix

For each item feature 410, an affinity matrix A is constructed 420, for all object or all frames in the video. The elements $a_{ij}$ of the affinity matrix are equal to a similarity of the corresponding items (objects or frames) i and j. The similarity is defined as $$a^{ij} = e^{-d(i,j)/2\sigma^2}, \tag{}$$

where d(i, j) is distance, and $\sigma^2$ is a constant scalar value. Note that the matrix $A \in \mathcal{R}^{n \times n}$ is a real semi-positive symmetric matrix, thus $A^T = A$.

In the case of the HMM-based features, the distance d(i, j) is measured using a mutual fitness score of the features. We define the distance between two trajectories in terms of their HMM parameterizations as $$d(T^a, T^b) = |L(T^a; \lambda^a) + L(T^b; \lambda^b) - L(T^a; \lambda^b) - L(T^b; \lambda_a)|, \tag{1}$$

which corresponds the cross-fitness of the trajectories to each others' models.

The $L(T^a; \lambda^a)$ $L(T^b; \lambda^b)$ terms indicate a likelihood of the trajectories to their own fitted model, i.e., we obtain the maximum likelihood response for the models. The cross terms $L(T^a; \lambda^b)$ and $L(T^b; \lambda^a)$ reveal the likelihood of a trajectory generated by the other trajectories model. In other words, if two trajectories are identical, then the cross terms have a maximum value, and Equation 1 is equal to zero. On the other hand, if two trajectories are different, then their likelihood of being generated from each other's model is small, and the distance is large.

Eigenvector Decomposition

The decomposition of a symmetric matrix into eigenvalues and eigenvectors is known as eigenvector decomposition. Up to now, this has been done using spectral clustering, G. L. Scott and H. C. Longuet-Higgins, "Feature grouping by relocalisation of eigenvectors of the proximity matrix" *Proc. British Machine Vision Conference*, pp. 103-108, 1990, M. Meila and J. Shi, "Learning Segmentation by Random Walks," *Proc. Advances in Neural Information Processing Systems*, 2000, Ng, M. Jordan, and Y. Weiss, "On spectral clustering: Analysis and an algorithm," *Proc. of Neural Information Processing Systems*, 2001, and Y. Weiss, "Segmentation using eigenvectors: a unifying view," *Proc. IEEE International Conference on Computer Vision*, 975-982, 1999.

However, how to establish a relationship between an optimal clustering of the data distribution and the number of eigenvectors that should be used for clustering is not known.

We show that the number of largest eigenvalues, in terms of absolute value, to span a subspace is one less than the number of clusters.

Let $V \equiv [v_1 \ v_2, \ldots, V_n]$ be a matrix formed by the columns of the eigenvectors. Let D be a diagonal matrix diag$[\lambda_1, \mu_2, \ldots \lambda_n]$. If the eigenvalues are $\lambda_1 \leq \lambda_2 \leq \lambda_n$, then the generalized eigenvalue problem is $$(A-I)V = [Av_1 \ldots Av_n] = [\lambda_1 v_1 \ldots \lambda_n v_n] D = VD \tag{2}$$

and $A = VDV^{-1}$. Because the matrix A is symmetric, the eigenvectors that correspond to distinct eigenvalues are real and orthogonal $VV^T = V^TV = I$, which implies $A = VDV^T$.

Let a matrix $P_k$ be a matrix in a subspace K that is spanned by the columns of the matrix V such as $P_k = [v_1 \ v_2 \ldots v_k, 0]$, where V is the orthogonal basis satisfying $A = VDV^T$. Now, we define vectors $p_n$, the rows of the truncated matrix $P_k$, as $$P_k = \begin{bmatrix} p_1 \\ \vdots \\ p_n \end{bmatrix} = \begin{bmatrix} v_{11} & \ldots & v_{1k} & 0 & \ldots \\ \vdots & & & & \vdots \\ v_{n1} & \ldots & v_{nk} & 0 & \ldots \end{bmatrix} \tag{3}$$

We normalize each row of the matrix $P_k$ by $p_{ij} \leftarrow p^{ij}/\sqrt{\Sigma_j^k p_{ij}^2}$. Then a correlation matrix is determined using the normalized rows by $C_k = P_k P_k^T$. For a given $P_k$, the value of $p_{ij}$ indicates the degree of similarity between, e.g., an object i and an object j. Values close to one correspond to a match, whereas negative values and values close to zero suggest that objects (or frames) are different. Let $\epsilon$ be a threshold that transfers values of matrix Ck to binary quantized values of an association matrix $W_k$ as $$w_{ij} = \begin{cases} 1 & c_{ij} \geq \epsilon \\ 0 & c_{ij} < \epsilon \end{cases} \tag{4}$$

where $\epsilon \approx 0.5$. Then, the clustering becomes a grouping of the objects that have association values equal to one, i.e., $w_{ij} = 1$.

To explain why this works, remember that eigenvectors are the solution of the classical extremal problem max$v^T Av$, constrained by $v^T v = 1$. That is, find the linear combination of variables having the largest variance, with the restriction that the sum of the squared weights is 1. Minimizing the usual Lagrangian expression $v^T Av - \lambda(v^T v - 1)$ implies that $(1-A)v = \lambda Iv$. Thus, v is the eigenvector with the largest eigenvalue.

As a result, when we project the affinity matrix columns on the eigenvector $v_1$ with the largest eigenvalue and span $K_1$, the distribution of the $a_{ij}$ has the maximum variance, and therefore, the maximum separation. Keep in mind that a threshold operation performs best if the separation is high. To this end, if the distribution of values has only two distinct classes, then a balanced threshold passing through the center divides the points into two separate clusters. With the same reasoning for the eigenvector $v_2$ with the second largest eigenvalue, we obtain the basis vector that gives the best separation after normalizing the projected space using the eigenvector $v_1$ because $v_1 \perp v_2$.

Thus, we state that the number of largest eigenvalues, in absolute value, to span a subspace is one less than the number of clusters.

As opposed to using only the first eigenvector, or the first and second eigenvectors, or the generalized second minimum, which is the ratio of the first and the second largest, depending the definition of affinity, the correct number of eigenvectors should be selected with respect to the target cluster number. Using only one or two eignevectors, as typically is done in the prior art, fails for applications where there are more than two clusters.

The values of the thresholds still need be determined. We have obtained projections that give us a maximum separation, but we did not determine the degree of separation, i.e., maximum and minimum values of projected values on the basis vectors. For convenience, we normalize the projections i.e., the rows of current projection matrix ($V_k$) as $p^T p = 1$, and then compute the correlation $V_k^T V_k$. Correlation makes rows that have similar projections close to 1, equal values are exactly 1, and highly dissimilar values are 0. By maximizing the separation or distance between the points in different clusters on an orthonormal basis, we maximize the orthogonality of points depending their clusters; $p_i p_j \approx 1$, when they are in the same cluster, and $p_i p_j \approx 0$, when they are in different clusters.

The number of clusters can be estimated in an ad hoc manner. After each eigenvalue reconstruction of the approximate affinity matrix A, we determine the validity score $\alpha_k$ 460 using the clustering results as $$\alpha_k = \sum_c^k \frac{1}{M_c} \sum_{i,j \in Z_c} p_{ij} \qquad (5)$$

where $Z_c$ is set of items (objects or frames) included in the cluster c, $N_c$ number of objects (or frames) in $Z_c$. The validity score increases for better fits. Thus, by evaluating the local maxima of this score we determine the correct number of cluster number automatically to characterize the usual events 470.

Thus, we answer the natural question of clustering; "what should be the total cluster number?" As a summary, the clustering for a given maximum cluster number k* includes:
1. Determine the affinity matrix A eigenvectors using Ritz values $\lambda_k \cong \theta_k$, find eigenvectors $v_k$ for k=1, ..., k*;
2. Find $P_k = V_k V_k^T$ and $Q_k$ for k=1, ..., k*;
3. Determine clusters and calculate validity score αk;
4. Determine $\alpha' = d\alpha/dk$ and find local maxima.

The maximum cluster number k* does not affect the determination of the number of clusters that give the best fit, it is only an upper limit.

Comparison with K-means

The eigenvector clustering according to the invention has a number of advantages of prior art k-means clustering.

Most important, a 'mean' or a 'center' vector cannot be defined for trajectories that have different durations. We only have pair-wise distances. In eigenvector decomposition, mutual inter-feature distance as opposed to center-distance is used.

Ordinary k-means clustering can oscillate between cluster centers, and different initial values can cause completely dissimilar clusters. In addition, k-means clustering can become stuck to a local optima. Therefore, k-means based cluster number estimation is not always accurate. Furthermore, the computational complexity of k-means clustering increases with the larger sizes of the feature vectors.

Detection of Unusual Events

Figure 5:
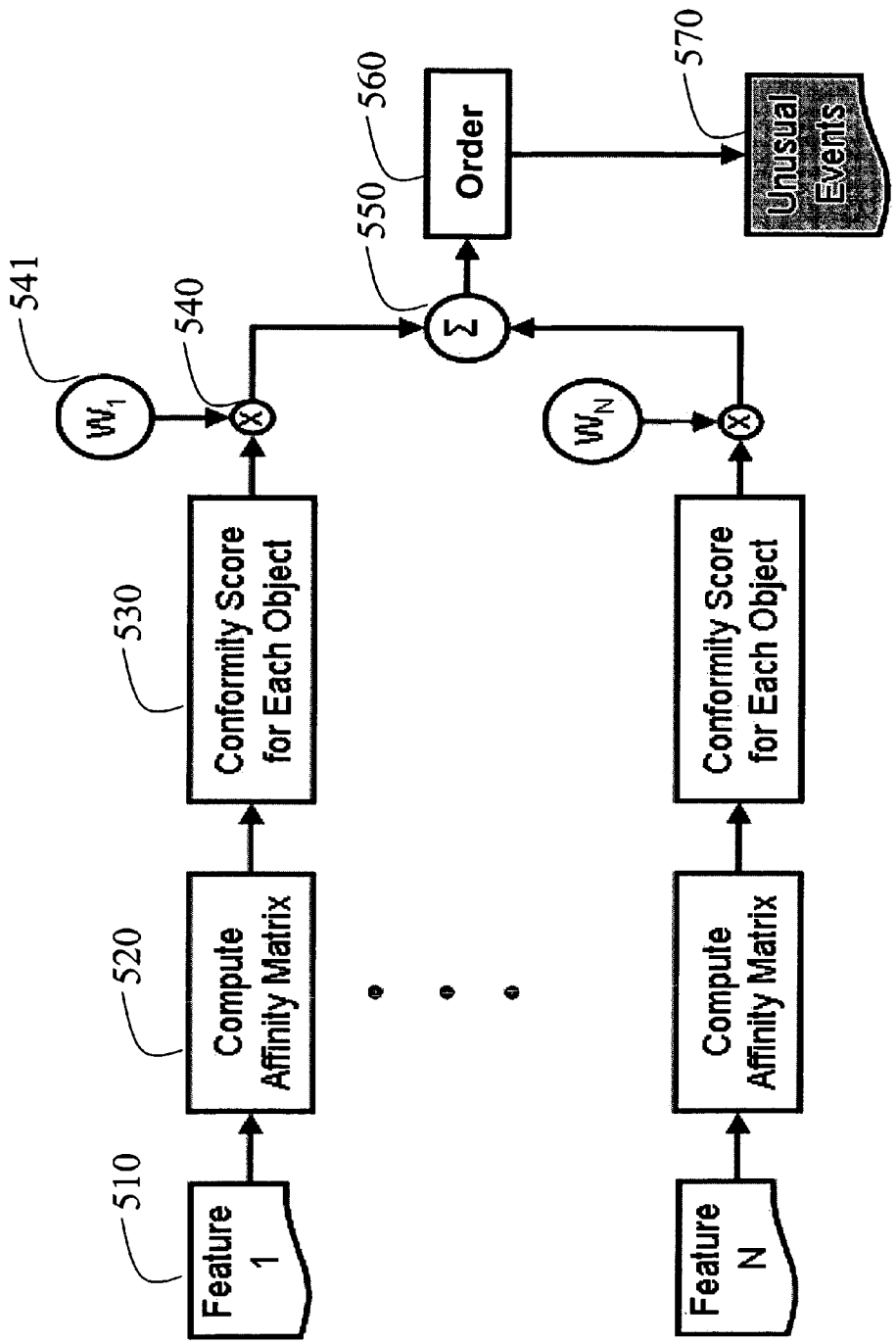
FIG. 5 is a flow diagram of a method for detecting unusual events.

FIG. 5 shows a method 500 for detecting unusual events in a video. As described above, item features 510 are extracted. For each feature, an affinity matrix is determined 520 on an item-per-item basis. A conformity score is determined 530 for each item (object or frame). The conformity scores can be weighted by weights 541, depending on the application, yielding weighted conformity scores 540. The weighted conformity scores for each item are summed 550 and the scored items ordered 560. The items with the lowest total conformity scores are deemed to determine the unusual events 570.

As shown in FIG. 6 for a simple three item affinity matrix, the conformity score of an item (object or frame) i for a given feature f is the sum of the corresponding row or column of the affinity matrix that belongs to that feature $$\beta_f(i) = \Sigma_n a_{in}.$$

To sum responses of different features, we use a weighted sum 550. We obtain a total conformity score for item object as a weighted sum $$\beta(i) = \frac{1}{M} \sum_f w_f \beta_f(i), \qquad (6)$$

where $w_f = 1$ for equivalent features. Then, we order 560 each item (object or frame) with respect to its summed conformity scores. The items (objects or frames) that have the lowest scores are the most different from items having the highest scores, and can be associated with the most unusual events 570.

One distinct advantage of the conformity score 530 is that it does not assert unusuality in the case where all events are similar. Furthermore, the more an event is dissimilar to the rest of the events, the lower the score becomes. This shows that the conformity score according to the invention effectively determines the degree of the ambiguity, as well as distinguishing the unusual event from the ordinary.

Feature Selection and Adaptive Weighting

It is also possible to select the most discriminating features before the clustering is performed. However, feature selection requires a priori knowledge of the application, and an understanding of the nature of events. Thus, we prefer to let the clustering determine the discriminating features, instead of a preselection of such features. Moreover, we find that a truncation of the eigenbasis amplifies unevenness in the distribution of features by causing features of high affinity to move towards each other, and others to move apart.

The feature variance is an effective way to select the above feature weights $w_i$. The feature variance is determined from the corresponding affinity matrix. In cases where the feature supplies distinctive information, the variance has a higher value. The opposite is also true. Thus, we assign the weights as $$w_f = \frac{1}{n^2} \sum_i \sum_j (a_{ij} - \mu_f)^2 \qquad (7)$$

where $a_{ij}$ is an element of the affinity matrix $A_f$ for the feature f. This emphasizes important features.

Effect of the Invention

The invention provides a method for detecting usual and unusual events in a video. The events are detected by first constructing an aggregate affinity matrix from features of associated items extracted from the video. The affinity matrix is decomposed into-eigenvectors, and the eigenvectors are used to reconstruct approximate estimates of the aggregate affinity matrix. Each matrix is clustered and scored, and the clustering that yields the highest scores is used to detect events.

Because the features used by the invention are very expressive, the invention is able to detect events that cannot be detected using prior art features. Thus, the invention offers an overall substantial improvement over prior art methods, both in terms of computational simplicity and enhanced functionality.

The expressive features according to the invention enable detection of events that cannot be detected using prior art descriptors. We apply an unsupervised clustering framework to a video to detect events. This framework is not adversely affected by increases in feature dimensionality.

The invention uses clustering of variable length trajectories by pair-wise affinities as opposed to the unstable interpolation based approaches of the prior art. The invention uses feature selection criteria to amplify the contribution of discriminative features. The invention also shows that the number of largest eigenvalues, in terms of absolute value, to span a subspace is one less than the number of clusters.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

I claim:

1. A method for detecting usual events in a video, the video including a plurality of items, comprising:

extracting a set of features for each item in the video, in which each item is an object, and the features are object-based, and in which the features are associated a trajectory of the object;

constructing an affinity matrix for each feature according to the items;

aggregating the affinity matrices into an aggregate affinity matrix;

decomposing the aggregate affinity matrix into an set of eigenvectors, in a first to last order;

reconstructing a plurality of approximate aggregate affinity matrices, wherein a first approximate aggregate affinity matrix is reconstructed from the first eigenvector, and each next approximate aggregate affinity matrix includes one additional one of the eigenvectors in the first to last order, and a last approximate aggregate affinity matrix is reconstructed from all of the eigenvectors;

clustering items associated with each approximate aggregate affinity matrix into clusters;

evaluating each approximate aggregate affinity matrix to determine a validity score for each approximate aggregate affinity matrix; and selecting the approximate aggregate affinity matrix with a highest validity score as the clustering of the items associated with usual events;

emitting the trajectories as the observable output of the usually events associated with the objects.

2. The method of claim 1, in which the features are visual features.

3. The method of claim 1, in which the features are audio features.

4. The method of claim 1, in which the items are frames, and the features are frame-based.

5. The method of claim 1, in which the features include histograms, hidden Markov models, and scalar values of low-level features.

6. The method of claim 1, in which features are features are weighted and normalized during the construction.

7. The method of claim 1, in which the reconstructing is a cross-product of the eigenvectors.

8. The method of claim 1, in which the trajectories are of unequal duration.

* * * * *